July 15, 1958      G. M. TRACY      2,843,717
INDIVIDUAL TAP INSTANTANEOUS WATER HEATER
Filed Sept. 18, 1956
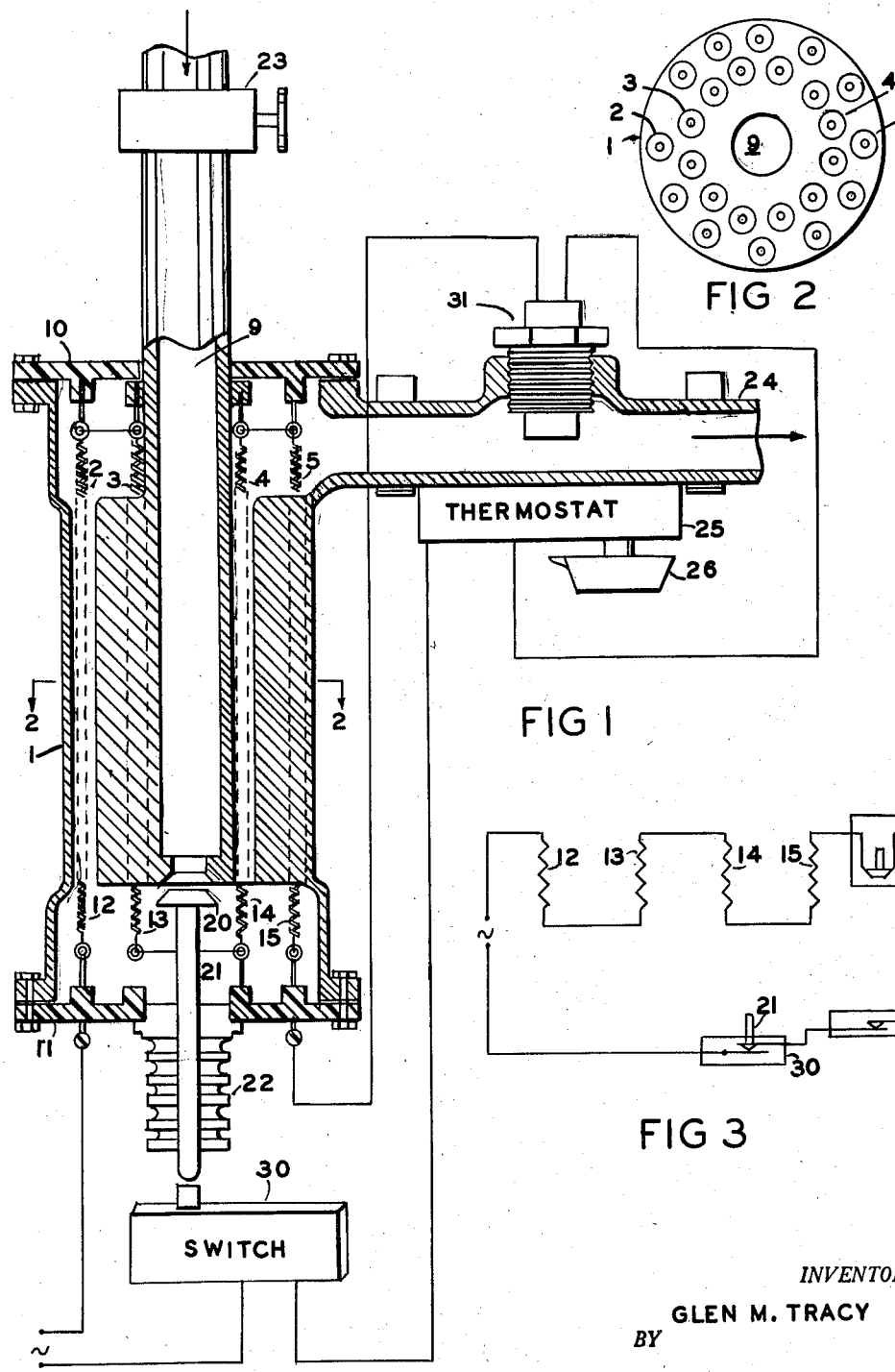
INVENTOR.
GLEN M. TRACY
BY United States Patent Office 2,843,717
Patented July 15, 1958

2,843,717

INDIVIDUAL TAP INSTANTANEOUS WATER HEATER

Glen M. Tracy, Rockville Centre, N. Y.

Application September 18, 1956, Serial No. 610,473

4 Claims. (Cl. 219—39)

This invention relates to individual tap water heaters and more particularly to such means with suitable automatic controls.

Instantaneous individual tap water heaters offer many advantages and economies.

In a complete new installation, the entire hot water system, including tank, heater and hot water piping may be eliminated, together with their radiation heat losses which are quite large.

Great flexibility may also be obtained in the hot water system. For instance, various taps may be turned off and different temperatures may be supplied at different taps.

The problem of heat loss from conventional hot water systems is quite large since the hot water taps and pipes radiate heat twenty-four hours a day. Also, the hot water must run for some time in conventional systems to obtain the proper temperature at the tap, due to these heat losses. In areas of high water charge, the loss of this water itself may be appreciable.

The present invention comprises a small, compact unit which is mounted adjacent the water tap. The unit comprises a heat chamber having a large input water tube and a plurality of smaller tubes or bores. A pressure actuated valve is connected between the output of the large input tube or shaftway and the smaller tubes. When the water is turned on at the tap, the valve will be opened by the water pressure. Automatic electrical switching means, including both a thermostat which may be set for a predetermined temperature and a high temperature fuse, are provided.

The invention may also be used as a booster in normal heating systems which may then be operated more efficiently at a base temperature, for instance 110°.

Accordingly, a principal object of the invention is to provide new and improved instantaneous water heating means.

Another object of the invention is to provide new and improved individual tap water heating means.

Another object of the invention is to provide new and improved individual tap water heating booster means having suitable automatic controls.

Another object of the invention is to provide new and improved individual tap water heating means having suitable automatic controls including means to automatically energize the heating elements and thermostat means to control the water temperature.

Another object of the invention is to provide new and improved individual tap water heating means having suitable automatic controls including means to automatically energize the heating elements and thermostat means to control the water temperature and safety fuse means to avoid any danger of extremely high temperatures.

These and other objects of the invention will be apparent from the following specification and drawings, of which:

Figure 1 is a sectional view of an embodiment of the invention.

Figure 2 is a sectional view along the line 2—2 of Figure 1.

Figure 3 is an electrical circuit diagram of the embodiment of Figure 1.

The present heating system heats by means of both convection and conduction.

Convection is the transfer of heat between a fluid and a surface by the circulation or mixing of the fluid. In free or natural convection (such as found in water heaters) the fluid motion is caused by gravity forces due to the differences in density between the hotter and colder parts. This, of course, is the slowest method for heating a body of water. However, in forced convection the motion is produced artificially, as by a pump, blower, or other external forces not connected with the temperature of the fluid. By the use of forced convection, the speed of heating a body of water can be greatly increased.

Conduction is the transmission of heat by molecular vibration from one part of a body to another, or from one body to another body in direct contact with it. Conduction, except for a few isolated instances, is not used as a heat transfer method in conventional water heaters.

The system of the present invention comprises three general portions. Heating chamber means, a water flow control valve, and heat control means.

Referring to Figures 1 and 2, the heating chamber comprises an elongated member 1 having a large hollow tube 9 and a plurality of smaller tubes 2, 3, 4, 5. Electrical heating element wires 12, 13, 14 and 15 are suspended in the smaller tubes. In the construction shown in Figure 1, the smaller tubes are bores in a solid block. However, the member 1 could be constructed of a large hollow pipe and a plurality of smaller tubes. The end seals 10 and 11, connected to the member 1, are of insulating material such as plastic or glass to prevent a short-circuit of the electrical heating elements. The heating elements are mounted on suitable hooks or other supports mounted on the end members. The member 1 may be constructed of a block of metal or of an insulating material. It has been found that ordinary water will not cause sufficient conduction to cause any short-circuit effects. However, if the water had a high mineral content such as salt water from the ocean, it would probably be preferable to construct the member 1 of insulating material. However, the present invention does not contemplate the use of such water.

A valve 20 is mounted at the lower end of the input tube 9 and the valve stem 21 is spring loaded in closed position and mounted for axial movement by the bellows 22. When the water tap 23 is opened the water pressure will open the valve 20 and the water will flow up through the smaller tubes and out through the pipe 24.

The electrical heating system comprises a switch 30 which may be conventional and which is connected to be turned on by the valve stem 21 when the valve 20 is opened. A thermostat 25 which may be conventional, is mounted on the output pipe 24 adjacent the heating chamber member 1 and is electrically connected in series with the switch 30. The thermostat preferably contains a control knob 26 by means of which the temperature may be selected.

In order to absolutely prevent the possibility of scalding hot water due to any malfunction of the thermostat or any other part of the system, a water temperature fuse element 31 may be mounted on the output pipe 24. This fuse may be of a type having a spring loaded contact member held in position by a fusible element, as shown in my co-pending application for Thermal Fuse, Serial No. 606,719, filed August 28, 1956. When the water temperature reaches the melting point of the fusible material, it melts, releasing the spring and opening the electrical contacts which are connected in series with the heating elements. The fuse is not absolutely essential but is desirable to avoid any possibility of a dangerous condition.

Figure 3 shows the electrical circuit diagram of the system. A source of voltage is connected through the switch 30, thermostat 25, and temperature fuse 31 in series with the heating elements 12, 13, 14 and 15. Actually there are a number of other heating elements, not shown, in parallel with the heating elements 12, 13, 14 and 15, each of which is suspended within one of the smaller tubes. Figure 2 shows an arrangement of heating elements and tubes.

It has been found that the present invention may be operated on 110 volts without drawing sufficient current to require special wiring. The resistance of the heating elements should be chosen in connection with the overall design considering other design factors such as the number of smaller tubes, and in certain areas the mineral content of the water.

One of the advantages of the present system is that there is a great area of contact for heat conduction between the heating elements and the water, since the water flow is in intimate contact with the heating element. In other words, this type system has a much greater efficiency than one having only one large heating element. The valve 20 is preferably adjusted so that a slight dripping of the tap would not energize the heating elements. Typical values for the thermostat would be 125° F. and 170° F. for the fuse.

I claim:

1. Individual water heater means comprising an elongated member having a hollow center and relatively thick walls, a plurality of bores through said walls parallel the axis of said member, heating element means in each of said bores, and a flow actuated valve connected at one end of said hollow center of said member, said valve comprising a stem mounted along the axis of said hollow center, and a bellows supporting said stem for movement along said axis.

2. Individual water heater means comprising an elongated member having a hollow center and relatively thick walls, a plurality of bores through said walls parallel the axis of said member, heating element means in each of said bores, a flow actuated valve connected at one end of said hollow center of said member, said valve comprising a stem mounted along the axis of said hollow center, a bellows supporting said stem for movement along said axis, and a switch connected to be directly actuated by said valve and connected to energize said heating element means.

3. Individual water heater means comprising an elongated member having a hollow center and relatively thick walls, a plurality of bores through said walls parallel the axis of said member, heating element means in each of said bores, a flow actuated valve connected at one end of said hollow center of said member, said valve comprising a stem mounted along the axis of said hollow center, a bellows supporting said stem for movement along said axis, a switch connected to be directly actuated by said valve and connected to energize said heating element means, and a thermostat mounted adjacent said member and electrically connected in series with said switch.

4. Individual water heater means comprising an elongated member having a hollow center and relatively thick walls, a plurality of bores through said walls parallel the axis of said member, heating element means in each of said bores, a flow actuated valve connected at one end of said hollow center of said member, said valve comprising a stem mounted along the axis of said hollow center and flexible means supporting said stem for movement along said axis.

References Cited in the file of this patent

UNITED STATES PATENTS

| | | |
|---|---|---|
| 1,866,221 | Pennington | July 5, 1932 |
| 1,920,284 | Wells | Aug. 1, 1933 |
| 2,044,634 | Rieder | June 16, 1936 |